United States Patent Office 3,235,580
Patented Feb. 15, 1966

3,235,580
PROCESS FOR THE PRODUCTION OF ISOTHIOCYANATES AND ISOTHIOCYANATE PRODUCTS
Engelbert Kühle, Cologne-Stammheim, Germany, assignor to Farbenfabriken Bayer Aktiengesellschaft, Leverkusen, Germany, a corporation of Germany
No Drawing. Filed Jan. 25, 1962, Ser. No. 168,800
Claims priority, application Germany, Feb. 11, 1961, F 33,193
7 Claims. (Cl. 260—454)

The present invention relates to and has as its object a new and useful process for the production of isothiocyanates, i.e., compounds which are also known as mustard oils and which contain in their molecule the group

—N=C=S

Several processes for the production of isothiocyanates are already known. For example, in one prior process, dithiocarbamic acid salts obtained by reaction of primary amines with carbon disulfide and alkali-metal hydroxides are decomposed by means of heavy metal salts, esters of chlorocarbonic acid, phosgene, sodium hypochlorite or iodine to give mustard oils. The reaction with phosgene is represented in the following equation:

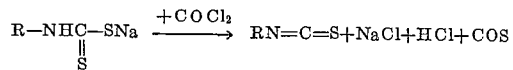

However, this process is limited to strongly basic amines, since weakly basic amines do not form dithiocarbamates.

Another known process for the production of isothiocyanates involves the decomposition of diaryl thioureas in acid media, but only aromatic mustard oils are obtainable in this way as may be seen from the following equation:

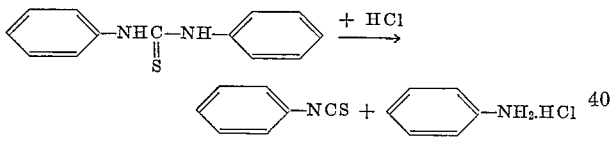

A method which can be applied more generally comprises the thiophosgenation of amines or amine salts according to the following equation:

$$R—NH_2 + CSCl_2 \rightarrow RN=C=S + 2HCl$$

This process is not of technical interest because thiophosgene is susceptible to decomposition and difficult to handle. In accordance with the present invention it has now been found that isothiocyanates are obtained in a simple and smooth manner by reacting isocyanide dihalides (imidocarbonyl halides) with alkali-metal or alkaline-earth-metal sulfides according to the following equation:

$$R—N=CX_2 + Me_2S \rightarrow R—N=C=S + 2MeX$$

In this equation R stands for any organic radical of the aliphatic, cycloaliphatic or aromatic series, X is a halogen atom and Me an alkali-metal or alkaline-earth-metal radical.

Instead of inorganic sulfides, appropriate salts of dithiocarbamic acids, xanthogenic acids, and mercaptans may also be used. The following reaction then takes place:

$$R—N=CX_2 + 2Me—S—R^1$$
$$\rightarrow R—N=C=S + 2MeCl + R^1—S—R^1$$

In this case $R^1$ is, for example, an alkyl radical or the radicals

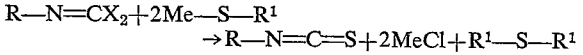

in which R″ preferably is a lower alkyl radical.

Examples of imidocarbonyl halides which are suitable for use in the process of this invention include methylimidocarbonyl chloride, ethylimidocarbonyl chloride, dodecylimidocarbonyl chloride, cyclohexylimidocarbonyl chloride, benzylimidocarbonyl chloride, phenylimidocarbonyl chloride, phenylimidocarbonyl bromide, 4-chlorophenylimidocarbonyl chloride, 2,4-dichlorophenylimidocarbonyl chloride, 4-nitrophenylimidocarbonyl chloride, naphthylimidocarbonyl chloride, and 1,4-bis(dichloroisocyanato) benzene.

In general, the reaction is carried out at room temperature or at a slightly elevated temperature by reacting a solution or suspension of the alkali-metal or alkaline earth metal salt in an organic solvent such as acetone, benzene, dioxane and the like, with the respective imidocarbonyl halide. However, the reaction may also be carried out in an aqueous medium. For this purpose it is expedient to add an emulsifier or solubilizer.

The isothiocyanates or mustard oils are intermediate products for further syntheses, but serve also themselves as pest control agents, for example as fungicides and/or nematocides.

The following examples are given for the purpose of illustrating the invention.

Example 1

To a solution of 65 grams of sodium sulfide (containing 60% $Na_2S$ by weight, which is equivalent to 0.5 mol of $Na_2S$) in 200 cc. of water, a solution of 104 grams (0.5 mol) 4-chlorophenylimidocarbonyl chloride in 50 ml. of acetone is added dropwise at 29–35° C. while cooling. After completion of the addition, the solution continues to react while the temperature rises to about 70° C. The crystal mass formed in the cold is taken up with benzene, filtered off from small amounts of an insoluble product, the benzene is evaporated off and the residue distilled under vacuum. 63 grams (=75% of the theoretical) of 4-chlorophenyl isothiocyanate (B.P. 125–127° C./15 mm. Hg, M.P. 43–45° C.) are thus obtained.

Example 2

To a suspension of 35 grams of sodium sulfide (containing 60% $Na_2S$ by weight) in 120 ml. of acetone, a solution of 52 grams of 4-chlorophenylimidocarbonyl chloride in 30 ml. of acetone is added dropwise at 25–38° C. Slight cooling with water is necessary. The reaction solution is poured into water, the oily layer taken up with benzene, the solvent evaporated off and the residue distilled off under vacuum. 35 grams (=86% of the theoretical) of 4-chlorophenyl isothiocyanate (B.P. 138–140° C./20 mm. Hg) are thus obtained.

In the same manner there is obtained from phenylimidocarbonyl chloride, phenyl isothiocyanate (B.P. 95° C./13 mm. Hg), and from 2,4-dichlorophenyl-imidocarbonyl chloride, 2,4-dichlorophenyl isothiocyanate (B.P. 139–142° C./13 mm. Hg).

It is also possible to use, instead of sodium sulfide, an equivalent amount of sodium dimethyl-dithiocarbamate or of potassium xanthogenate (potassium ethyldithiocarbonate).

Example 3

To a suspension of 36 grams of sodium sulfide (containing 60% $Na_2S$ by weight) in 150 ml. of acetone, a solution of 45 grams of cyclohexylimidocarbonyl chloride in 50 ml. of acetone is added dropwise at 22–30° C., while cooling with water. After termination of the addition, the solution continues to react until the temperature has reached about 36° C. The mixture is allowed to cool, poured into water and the oil is taken up with benzene. The product is washed with water until neutral, the benzene layer is dried, concentrated under vacuum and the residue is distilled. 27 grams (=77% of the theoretical) of cyclohexyl isothiocyanate having a boiling point of 108–109° C./18 mm. Hg is obtained.

Example 4

To a suspension of 28 grams of sodium sulfide (containing 60% $Na_2S$ by weight) in 150 ml. of acetone, a solution of 27 grams of 1,4-phenylenebis[imidocarbonyl chloride] in 100 ml. of acetone is added dropwise. The mixture is stirred for 2 hours, water is added and the 1,4-bis(isothiocyanato)benzene thus produced is filtered off with suction. Yield: 14 grams (=73% of the theoretical), M.P. 124–126° C. After recrystallization from alcohol, its melting point rose to 130–131° C.

Example 5

To a solution of 69.2 grams of pentachlorophenylimidocarbonyl chloride in 250 ml. of acetone there is added dropwise a suspension of 26 grams of 60% sodium sulfide (containing 60% $Na_2S$ by weight) in 50 ml. of water, at a temperature of below 30° C. Thereafter this mixture is stirred until the reaction is finished, water is then added and the pentachlorophenyl isothiocyanate thus produced is filtered off with suction. The reaction product is washed with water and distilled in vacuum. M.P. 86–90° C., B.P. 170–175° C./0.7 mm. Hg). Yield 47 grams.

In analogous manner compounds are obtained which have the following formulae:

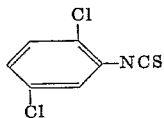

B.P. 145–148° C./12 mm. Hg, M.P. oily

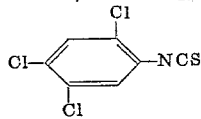

B.P. 171–173° C./14 mm. Hg, M.P. 47–49° C.

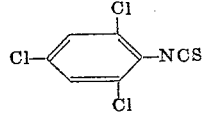

B.P. 171–173° C./14 mm. Hg, M.P. 77–78° C.

I claim:
1. Pentachlorophenyl isothiocyanate.
2. The process which comprises reacting at a temperature between approximately 22 and 70° C. a member selected from the group consisting of alkylimidocarbonyl chloride, arylimidocarbonyl chloride, chloro-substituted and nitro-substituted arylimidocarbonyl chloride, cycloalkylimidocarbonyl chloride and phenylenebis[imidocarbonyl chloride] with a divalent sulfur compound of the group consisting of alkali-metal sulfides, alkali-metal xanthogenates, and alkali-metal lower dialkyldithiocarbamates, and subsequently recovering the isothiocyanate thus formed.
3. A process as defined in claim 2 in which the divalent sulfur compound is sodium sulfide.
4. A process as defined in claim 2 in which the imidocarbonyl chloride is phenylimidocarbonyl chloride.
5. A process as defined in claim 2 in which the imidocarbonyl chloride is 2,4,6-trichlorophenylimidocarbonyl chloride.
6. A process for the production of 4-chlorophenyl isothiocyanate which comprises reacting 4-chlorophenylimidocarbonyl chloride in an aqueous solution with an approximately equimolecular proportion of sodium sulfide at a temperature between 22 and 70° C., and subsequently recovering the resulting 4-chlorophenyl isothiocyanate.
7. A process for the production of pentachlorophenyl isothiocyanate which comprises reacting pentachlorophenylimidocarbonyl chloride in aqueous acetone solution with an approximately equimolecular proportion of sodium sulfide at a temperature below 30° C., and subsequently recovering the resulting pentachlorophenyl isothiocyanate.

References Cited by the Examiner

Beaver et al., Chemical Abstracts, 1958, volume 51, p. 11270.

Petrov et al., Zhur. Obshchei Khimii, vol. 29, pp. 2165–8 (1959).

CHARLES B. PARKER, *Primary Examiner.*

IRVING MARCUS, *Examiner.*